Feb. 16, 1937. J. L. HECHT ET AL 2,071,259
WHEEL STRUCTURE
Filed Oct. 24, 1935
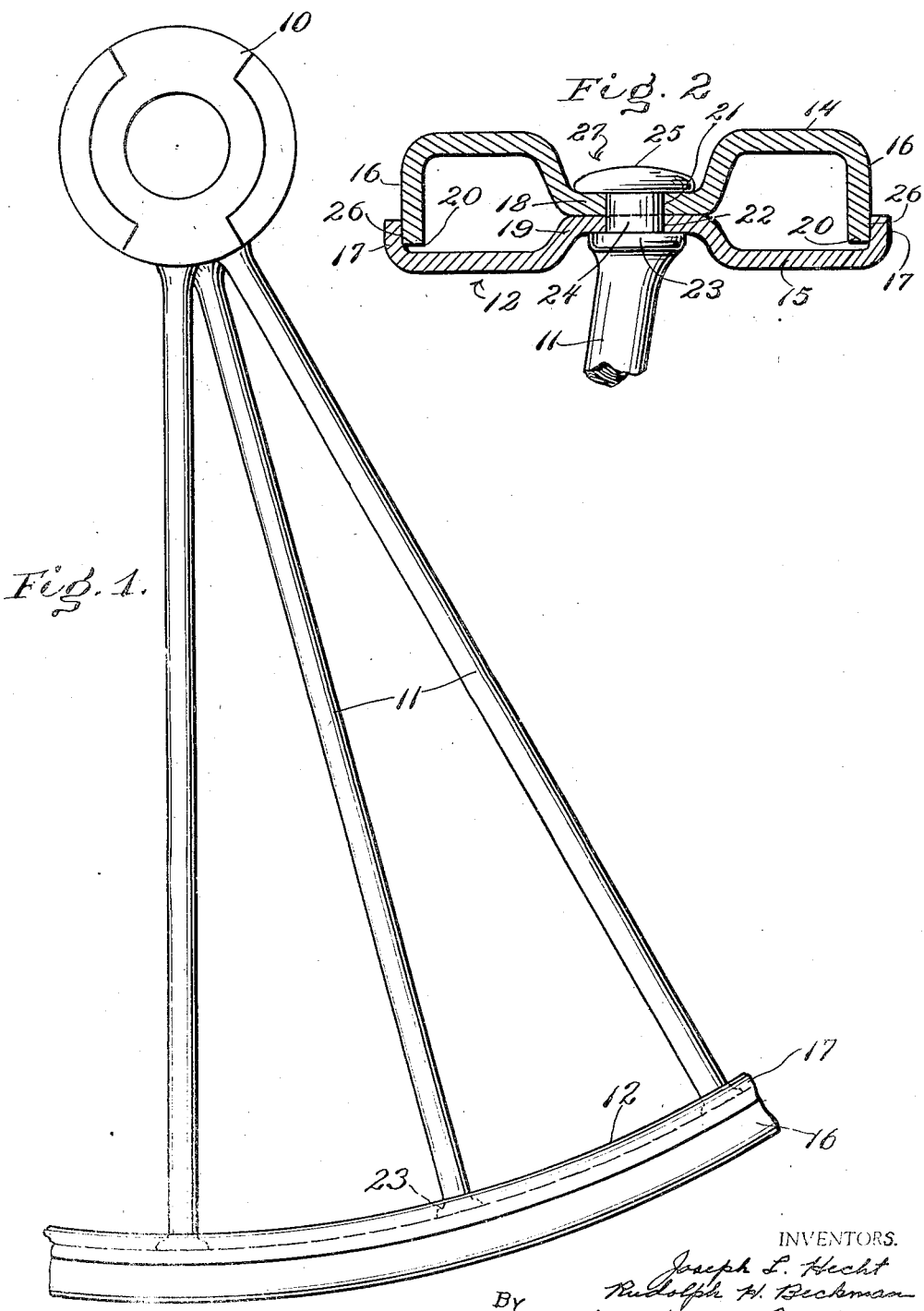
INVENTORS.
Joseph L. Hecht
Rudolph H. Beckman
BY Morrison, Kennedy & Campbell
ATTORNEYS.

Patented Feb. 16, 1937

2,071,259

UNITED STATES PATENT OFFICE 2,071,259

WHEEL STRUCTURE

Joseph L. Hecht and Rudolph H. Beckman, Davenport, Iowa, assignors to French & Hecht, Incorporated, a corporation of Iowa Application October 24, 1935, Serial No. 46,460

9 Claims. (Cl. 301—67)

This invention relates to wheel structures and particularly to light weight all metal wheels for use on various vehicles and machines employed in farming.

The rims of metal wheels commonly employed on farm machines usually consist each of a single metal band which, for the sake of lightness, is made as thin as possible and yet capable of meeting the demands which in use will be made upon it. The single band rims of course facilitate the manufacture of the wheels at a low cost and besides being of light weight the wheels are sturdy and the spokes can be solidly fastened to the rims, features which are most desirable. However, an objectionable feature of a rim of this character arises from its thinness, since it presents very low side walls over which soil can readily flow and be carried up on the rim, as the wheel rotates, until it reaches a point where it falls back by gravity and, when the soil is dry, creates a dust cloud which is not only annoying but, in many instances, is a great inconvenience and hindrance to anyone working with the machine.

It is an object of the present invention to obviate the foregoing objectionable feature by providing a wheel having a rim over which soil will not flow under ordinary conditions of the soil for which the wheel is particularly adapted.

Another object of the invention is the provision of a wheel of the character stated which is of light weight but strong and durable.

Still other objects of the invention are the provision of a wheel which is of simple construction and easy and inexpensive to manufacture.

In carrying out the invention, the wheel is provided with a metal rim formed to present deep closed side walls the equivalent of a wood felloe, the depth of the side walls being greater than the depth to which the rim penetrates the soil. To this end, the wheel comprises a hub, a rim formed of a plurality of members arranged together to present deep side walls, and intermediate connecting means anchored in the hub and rim and securing the rim members together. More specifically, the wheel rim comprises two concentric circumferentially extending metal bands in the form of opposed channel members whose side walls overlap or interfit and which are clamped together solidly by the upset ends of the spokes passing through aligned apertures formed in the bands.

In the accompanying drawing the invention has been shown merely by way of example and in preferred form, and obviously many variations and modifications may be made therein which will still be comprised within its spirit. It is to be understood, therefore, that the invention is not limited to any specific form or embodiment except insofar as such limitations are specified in the appended claims.

Referring to the drawing:

Fig. 1 is a side elevation of a portion of a wheel equipped with the improved rim; and Fig. 2 is a cross sectional elevation of the rim.

As usual, the wheel comprises a hub 10 in which the radially inner ends of the metal spokes 11 are anchored in any suitable manner, their opposite or radially outer ends being fastened to the rim 12.

According to the present invention, the rim 12 is made up of two circumferentially extending metal bands 14 and 15 whose bent over lateral edges form them into opposed channel members with side or channel walls 16 and 17, respectively. The channel walls 16 are deeper than the walls 17 and formed to fit snugly within the latter, so that the walls 16 and 17 together form deep closed side walls of the rim. Along a median circumferential line, the outer band 14 is depressed or bent radially inwardly as at 18; while the inner band 15 is correspondingly bent radially outwardly, as at 19, but to a lesser extent, the formation being such that the bent portions 18 and 19 engage when the bands are fastened together and do not allow the free edges 20 of the walls 16 to engage the inner band 15.

The rim bands 14 and 15 are formed with aligned drill holes or apertures 21 and 22, respectively, at spaced intervals along the said median circumferential line for the reception of the radially outer ends of the spokes 11. Near their outer ends, the spokes 11 are formed each with a shoulder 23 which engages and positions the inner band 15 radially; while the portion 24 of each spoke beyond the shoulder 23 passes through the apertures 21 and 22 and extends beyond the radially outer surface of the band 14 to allow it to be upset and headed over as at 25 to clamp the rim bands 14 and 15 solidily together between the shoulder 23 and head 25. The bent in portion 18 of the outer band 14 provides a recess 27 which accommodates the headed end 25 of the spoke so that the latter lies radially inward from the tread surface of the rim.

As appears clearly in Fig. 2, the upsetting of the spoke ends to head them over draws the bent in portions 18 and 19 into tight engagement and at the same time expands the portions 24 of the spokes to fill the apertures 21 and 22 solidly.

As already stated, the bent portions 18 and 19 of the bands are so formed that the free edges 20 of the walls 16 of the outer band 14 do not engage the inner band 15, thus insuring that a solid engagement of the portions 18 and 19 will be effected when the spoke end is upset. The channel walls 16 and 17 have a tight overlapping or lateral engagement, as at 26, to form the closed side walls of the rim, and although the spoke connection is intended to and does hold the rim bands 14 and 15 firmly enough to prevent relative lateral movement of the bands, the overlapping walls 16 and 17 render additional support for this purpose.

As already stated, the invention has been shown and described only in its preferred embodiment and many modifications will suggest themselves to those skilled in the art without departing from the scope of the invention. For example, other fastening means could be used instead of upsetting the spoke ends to clamp the rim bands together. Furthermore, the rim bands need not engage continuously with one another along a median circumferential line. It is emphasized, therefore, that the invention provides a wheel structure having a rim which presents deep side walls the equivalent of a wood felloe for the purpose stated, and is characterized by its simplicity and ease and low cost of manufacture without sacrifice of light weight, sturdiness and other desirable features.

Having thus described our invention, what we claim is:

1. A metal wheel structure comprising a hub, a plurality of members arranged to form a rim presenting deep side walls, said members being formed to engage intermediate said side walls, and intermediate connecting means anchored in the hub and said intermediate engaging portions of the rim members and securing the rim members together.

2. A metal wheel structure comprising a hub, a plurality of concentric circumferentially extending members arranged cooperatively to form a rim presenting deep closed side walls, said members being formed to engage intermediate said side walls, and intermediate connecting means anchored in the hub and said intermediate engaging portions of the rim members and securing the rim members together.

3. A metal wheel structure comprising a hub, a rim formed of two metal bands in the form of opposed channel members whose respective channel walls engage to form deep side walls of the rim, said channel members being formed to engage radially intermediate said side walls, and intermediate connecting means anchored in the hub and said radially engaging portions of said channel members and securing the channel members together.

4. A metal wheel structure, comprising a hub, a rim formed of two metal bands in the form of opposed channel members whose respective channel walls engage to form deep side walls of the rim, said channel members being formed to engage radially intermediate said side walls, aligned apertures formed in said radially engaging portions of the channel members, spokes having their inner ends anchored in the hub and their outer ends passing through said aligned apertures, and fastening means on the outer ends of said spokes holding said channel members together.

5. A metal wheel structure, comprising a hub, a rim formed of two metal bands in the form of opposed channel members whose channel walls overlap and form deep side walls of the rim, those of the radially outer band fitting inside those of the radially inner band and said bands being formed to engage radially intermediate said side walls, aligned apertures formed in said radially engaging portions of the bands, spokes having their inner ends anchored in the hub and their outer ends passing through said aligned apertures, and fastening means on the outer ends of the spokes holding the bands clamped together with their overlapping channel walls in engagement and forming a closed rim.

6. A metal wheel structure, comprising a hub, a rim formed of two metal bands in the form of opposed channel members whose channel walls overlap and form deep side walls of the rim, said bands being bent radially for engagement with one another, aligned apertures formed in the bent portions of the bands, spokes having their radially inner ends anchored in the hub and their radially outer ends passing through said aligned apertures, and fastening means on the outer ends of the spokes holding the bands clamped together with their bent portions engaging radially and their overlapping channel walls in engagement laterally and forming a closed rim.

7. A metal wheel structure, comprising a hub, a rim formed of two metal bands in the form of opposed concentric channel members whose channel walls overlap and form deep side walls of the rim, those of the radially outer band fitting inside those of the radially inner band and said bands being formed to engage radially along a median circumferential line, aligned apertures formed in the portions of said bands engaging along said median circumferential line, spokes having their inner ends anchored in the hub and their outer ends passing through said aligned apertures, and fastening means on the outer ends of the spokes holding the bands clamped together between said fastening means with the channel walls of the radially outer band in lateral engagement with the channel walls of the radially inner band and forming a closed rim.

8. A metal wheel structure, comprising a hub, a rim formed of two metal bands in the form of opposed concentric channel members whose channel walls overlap in lateral engagement with one another to form deep side walls of the rim, those of the radially inner band being relatively short and those of the radially outer band fitting inside the walls of the inner band and being relatively longer, constituting the greater portion of the side wall of the rim, both bands being formed to engage radially only along a median circumferential line, aligned apertures formed at spaced intervals in the median engaging portions of the bands, spokes having their inner ends anchored in the hub and their outer ends passing through said aligned apertures, and fastening means on the outer ends of the spokes for clamping said bands solidly together.

9. A metal wheel structure, comprising a hub, a rim formed of two metal bands in the form of opposed concentric channel members whose channel walls overlap in lateral engagement with one another to form deep side walls of the rim, those of the radially inner band being relatively short and those of the radially outer band fitting inside the walls of the inner band and being relatively longer, constituting the greater portion of the side wall of the rim, the radially outer band being depressed along a median circumferential line to an extent less than the height of the channel walls of said band and the radially inner band being bent radially outwardly to engage therewith, aligned apertures formed at spaced intervals in the median engaging portions of the bands, spokes having their inner ends anchored in the hub and their outer ends passing through said aligned apertures, shoulders formed on the spokes to engage the radially inner surface of the inner band, and the outer ends of the spokes being upset and headed over, solidly clamping the bands together along said median line to form a tight closed rim.

JOSEPH L. HECHT.
RUDOLPH H. BECKMAN.